United States Patent
Lin et al.

(10) Patent No.: US 11,428,893 B2
(45) Date of Patent: Aug. 30, 2022

(54) LENS DEVICE

(71) Applicants: Sintai Optical (Shenzhen) Co., Ltd., ShenZhen (CN); Asia Optical Co., Inc., Taichung (TW)

(72) Inventors: Guo-Quan Lin, ShenZhen (CN); Po-Jen Wang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 290 days.

(21) Appl. No.: 16/834,166

(22) Filed: Mar. 30, 2020

(65) Prior Publication Data
US 2020/0341229 A1    Oct. 29, 2020

(30) Foreign Application Priority Data

Apr. 24, 2019  (CN) .......................... 201920572015.3
Jul. 9, 2019   (CN) .......................... 201921069810.7

(51) Int. Cl.
*G02B 7/02*    (2021.01)

(52) U.S. Cl.
CPC ............ *G02B 7/025* (2013.01); *G02B 7/021* (2013.01)

(58) Field of Classification Search
CPC .............................. G02B 7/025; G02B 7/021
USPC ......................................................... 359/819
See application file for complete search history.

(56) References Cited

U.S. PATENT DOCUMENTS

| | | | |
|---|---|---|---|
| 5,781,351 A * | 7/1998 | Murakami | G02B 7/025 396/529 |
| 7,535,662 B2 * | 5/2009 | Hong | G02B 7/08 359/829 |
| 9,307,128 B2 * | 4/2016 | Ning | G02B 7/003 |
| 10,264,219 B2 * | 4/2019 | Mleczko | B60N 2/002 |
| 10,270,950 B2 * | 4/2019 | Avalos | B29C 66/54 |
| 11,220,224 B2 * | 1/2022 | Wang | H05K 1/0274 |
| 11,240,411 B2 * | 2/2022 | Byrne | H04N 5/22521 |
| 2002/0005997 A1 * | 1/2002 | Oba | G02B 7/04 359/811 |
| 2004/0179277 A1 * | 9/2004 | Stallard | G02B 7/026 359/811 |
| 2005/0104995 A1 * | 5/2005 | Spryshak | G03B 17/12 348/360 |
| 2007/0091179 A1 | 4/2007 | Yen | |

(Continued)

FOREIGN PATENT DOCUMENTS

| | | |
|---|---|---|
| CN | 1952720 A | 4/2007 |
| CN | 108363159 A | 8/2018 |
| CN | 208399783 U | 1/2019 |

*Primary Examiner* — Collin X Beatty
(74) *Attorney, Agent, or Firm* — McClure, Qualey & Rodack, LLP

(57) ABSTRACT

A lens device includes a lens barrel and a first lens. The lens barrel includes an object-side end. The first lens is fixed to the object-side end of the lens barrel, is configured to form an optical axis, and includes a minor diameter portion near an object side of the lens device and a major diameter portion near an image side of the lens device. The major diameter portion is connected to the minor diameter portion. A section of the first lens sectioned along the optical axis is higher at a middle portion than at both side portions. The first lens is protruded at the middle portion towards the object side to form a pillar with respect to the both side portions thereof.

19 Claims, 16 Drawing Sheets

(56) References Cited

U.S. PATENT DOCUMENTS

| | | | |
|---|---|---|---|
| 2011/0042558 A1* | 2/2011 | Naruse | G02B 6/4286 |
| | | | 427/553 |
| 2012/0019940 A1* | 1/2012 | Lu | G02B 7/025 |
| | | | 359/819 |
| 2018/0007246 A1* | 1/2018 | Shigemitsu | G02B 7/003 |
| 2018/0143395 A1* | 5/2018 | Takahashi | G02B 7/022 |
| 2018/0364441 A1* | 12/2018 | Hubert | H04N 5/2257 |
| 2019/0170920 A1* | 6/2019 | Park | H04N 5/2253 |
| 2019/0361153 A1* | 11/2019 | Wang | G02B 3/00 |
| 2020/0026022 A1 | 1/2020 | Lin | |
| 2020/0314298 A1* | 10/2020 | Liu | H04N 5/2252 |
| 2021/0103119 A1* | 4/2021 | Reckker | G02B 7/003 |
| 2022/0004086 A1* | 1/2022 | Eytan | H04N 5/23212 |

* cited by examiner

LENS DEVICE

BACKGROUND OF THE INVENTION

Field of the Invention

The invention relates to an optical device, and more particularly to a lens device.

Description of the Related Art

Many electronic devices (cell phones, tablet computers, etc.) are provided with front lens devices. FIGS. 1-2 depict the structure of a known lens device 100. As shown, the lens device 100 includes a lens barrel 101 and a plurality of lenses disposed in the lens barrel 101, wherein the lens closest to an object side of the lens device 100 is a first lens 102. The first lens 102 is entirely surrounded by the lens barrel 101. The lens barrel 101 has an end surface directed at the object side, and the first lens 102 has an effective-diameter region in which a top point is lower than the end surface of the lens barrel 101 directed at the object side. In the lens device 100, the first lens 102 occupies much space in the lens barrel 101 and has a limited view angle, and the lens device 100 is somewhat thick because the first lens 102 is entirely surrounded by the lens barrel 101.

Additionally, during assembly of the lens device 100, the adhesive-dispensing operation and adhesive-curing process are necessarily performed in the interiority of the lens barrel 101 that is not convenient. The amount of adhesive cannot be always controlled well because the space between the major diameter portion of the first lens 102 and the inner surfaces of the lens barrel 101 is small. The connection of the first lens 102 to the lens barrel 101 will be not firm if the amount of adhesive dispensed is not sufficient. By contrast, the adhesive may spill over to contaminate the inner surfaces of the lens barrel 101 if an excessive amount of adhesive is provided.

BRIEF SUMMARY OF THE INVENTION

The invention provides a lens device with reduced thickness, wide view angle, and good optical performance, and the assembly of the lens device is convenient.

The lens device in accordance with an exemplary embodiment of the invention includes a lens barrel and a first lens. The lens barrel includes an object-side end. The first lens is fixed to the object-side end of the lens barrel, is configured to form an optical axis, and includes a minor diameter portion near an object side of the lens device and a major diameter portion near an image side of the lens device. The major diameter portion is connected to the minor diameter portion. A section of the first lens sectioned along the optical axis is higher at a middle portion than at both side portions. The first lens is protruded at the middle portion towards the object side to form a pillar with respect to the both side portions thereof.

In another exemplary embodiment, the first lens further includes a first circumferential surface, at least one groove is formed on the first circumferential surface, and the groove is annular and is extended around a center where the optical axis passes through.

In yet another exemplary embodiment, a cross section of the groove includes a first inner side and a second inner side, one of which is extended at an acute angle with respect to the optical axis, and the other of which is extended at an acute angle with respect to the optical axis or is perpendicular to the optical axis, wherein the first inner side is closer to the object side than the second inner side while the second inner side is closer to the image side than the first inner side.

In another exemplary embodiment, the sum of the angle of the first inner side to the optical axis and the angle of the second inner side to the optical axis OA ranges from 25° to 75°.

In yet another exemplary embodiment, the sum of the angle of the first inner side to the optical axis and the angle of the second inner side to the optical axis OA ranges from 70° to 120°.

In another exemplary embodiment, the lens barrel further includes a cap, the cap includes an annular end portion, the annular end portion is connected to the minor diameter portion, the lens barrel is provided with a first receiving opening, and a part of an outer periphery of the major diameter portion contacts the first receiving opening.

In yet another exemplary embodiment, the outer periphery of the major diameter portion includes a non-circular edge portion and a circular edge portion connected to each other.

In another exemplary embodiment, a receiving space is formed between the non-circular edge portion of the outer periphery of the major diameter portion and the first receiving opening, a flat surface is formed on the non-circular edge portion, and the flat surface is parallel to a plane formed in the optical axial direction.

In yet another exemplary embodiment, an annular space is formed between an image-side end of the annular end portion and an object-side end of the minor diameter portion, and the annular end portion is configured to form a stop structure at an object-side end of the first lens.

In another exemplary embodiment, an object-side end of the minor diameter portion includes a concave edge, and the annular end portion is configured to form a stop structure at an object-side end of the first lens.

In yet another exemplary embodiment, an adhesive is provided for the receiving space to fix the first lens to the lens barrel; a projected area of the adhesive onto another plane perpendicular to the optical axis ranges from 10% to 60% of a cross-sectional area of the first receiving opening of the lens barrel.

In another exemplary embodiment, a projected area of the major diameter portion of the first lens onto another plane perpendicular to the optical axis ranges from 40% to 90% of a cross-sectional area of the first receiving opening of the lens barrel.

In yet another exemplary embodiment, the cap further includes a cylindrical main body connected to the annular end portion and disposed around the minor diameter portion.

In another exemplary embodiment, the minor diameter portion includes an image-side portion and an object-side portion, an outer diameter of the image-side portion is greater than that of the object-side portion to form a step surface therebetween, and the cylindrical main body is disposed around the object-side portion.

In yet another exemplary embodiment, the lens barrel further includes a cap, a major diameter part near the image side, and a minor diameter part near the object side; the cap is connected to the minor diameter part; the major diameter part is connected to the minor diameter part to form a step surface therebetween; the cap is located where an object-side end of the lens device is; the major diameter portion is fixed in the major diameter part; the minor diameter portion extends from the major diameter portion toward the object side along the optical axis, and enters the minor diameter part; the minor diameter portion is flushed with or is lower than an object-side surface of the cap.

In another exemplary embodiment, the cap is provided with an opening; the opening includes a straight side or a curved side; the minor diameter portion directed at the object-side surface corresponds to the opening in shape; the opening is in shape of circle, non-circle, polygon with sides arranged symmetrically with respect to the optical axis, bottle, oak barrel, or polygon.

In yet another exemplary embodiment, a diameter of the opening is less than or equals an outer diameter of the minor diameter portion directed at the object-side surface so as to form a stop structure at an object-side end of the first lens.

In another exemplary embodiment, an end portion of the lens barrel directed at the object side is provided with a first lens-fixing opening; the major diameter portion is configured to contact an inner surface of the end portion of the lens barrel; the minor diameter portion extends from the major diameter portion toward the object side along the optical axis and protrudes from the first lens-fixing opening; the lens barrel, except the end portion, is made of plastic; and the end portion of the lens barrel is made of metal.

In yet another exemplary embodiment, an end portion of the lens barrel is directed at the object side, and the lens barrel further includes a major diameter part near the image side and a minor diameter part near the object side; between the end portion on the object side and another end portion on the image side of the lens barrel, a plurality of straight sides are formed perpendicular to the optical axis direction; the straight sides are connected to form a part of outer periphery of the major diameter part of the lens barrel; the lens barrel further includes a plurality of abutting portions which are oppositely arranged on the outer periphery of the major diameter part, and a protrusion is provided at a middle of the abutting portion.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
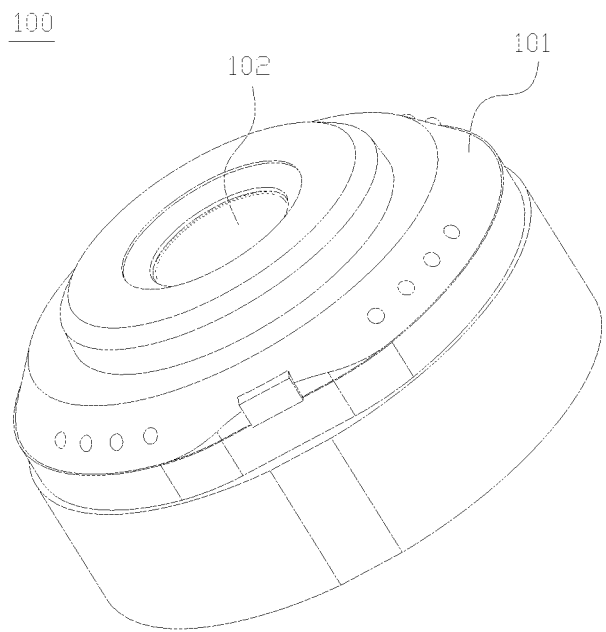
FIG. 1 depicts the structure of a known lens device.
Figure 2:
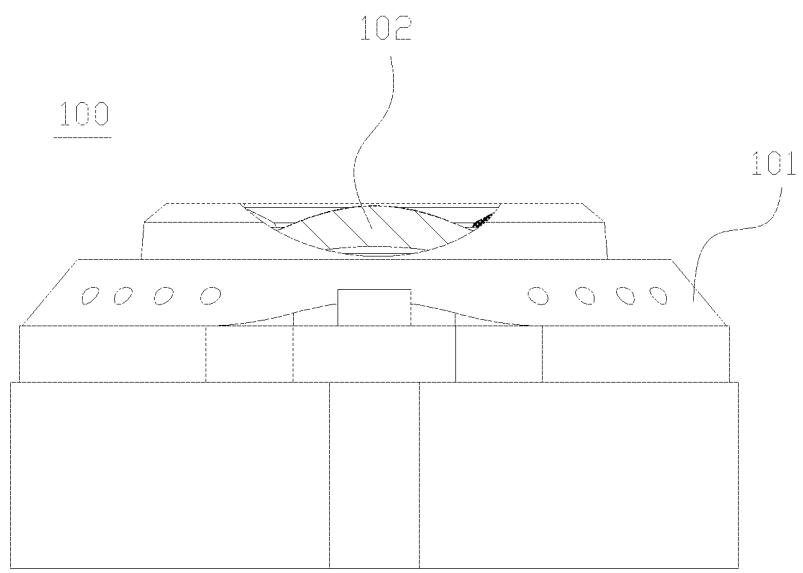
FIG. 2 is a partially sectional view of the lens device of FIG. 1.
Figure 3A:
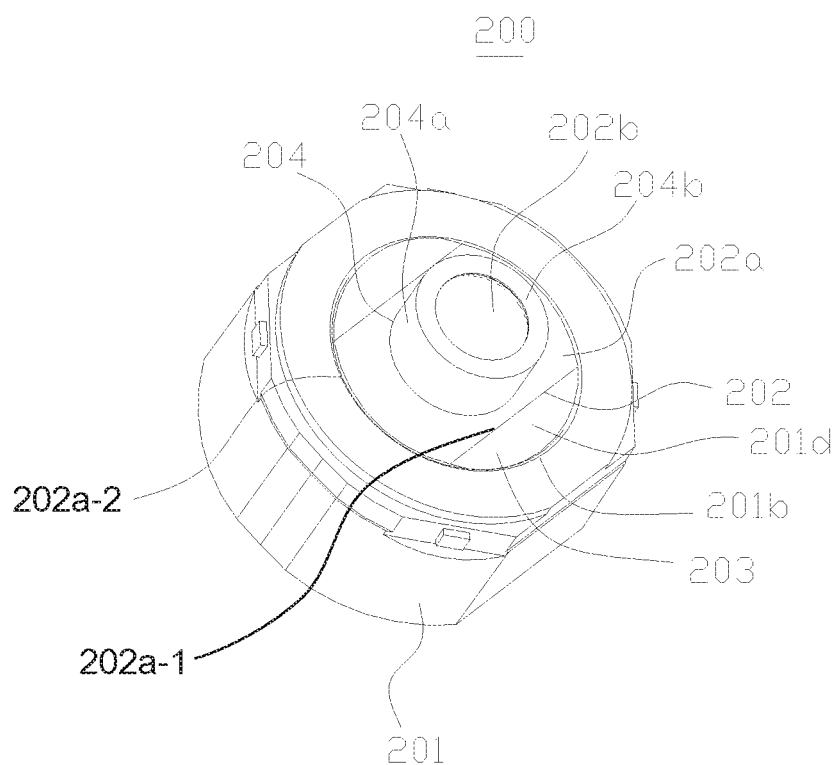
FIG. 3A depicts the structure of a lens device in accordance with a first embodiment of the invention.
Figure 3B:
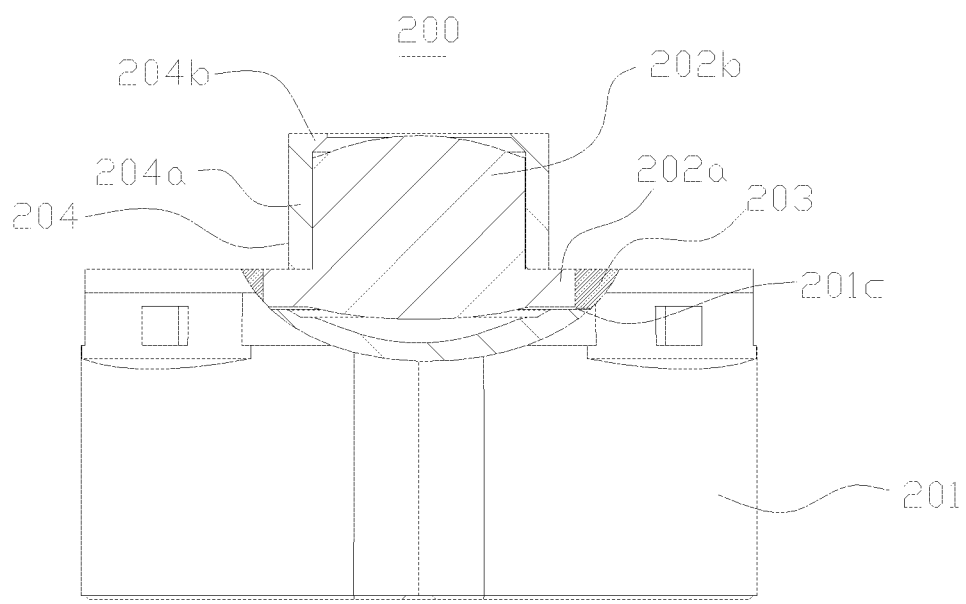
FIG. 3B is a partially sectional view of the lens device of the first embodiment of the invention.
Figure 3C:
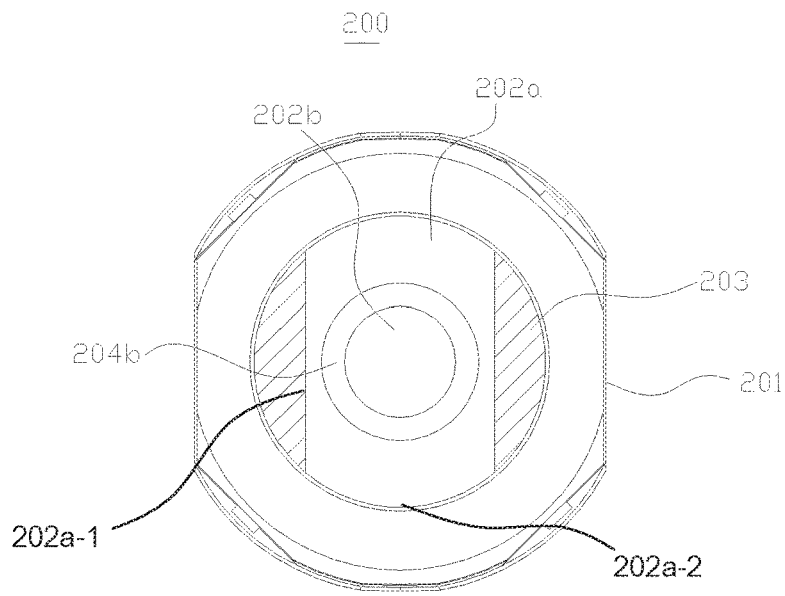
FIG. 3C is a top view of the lens device of the first embodiment of the invention.
Figure 3D:
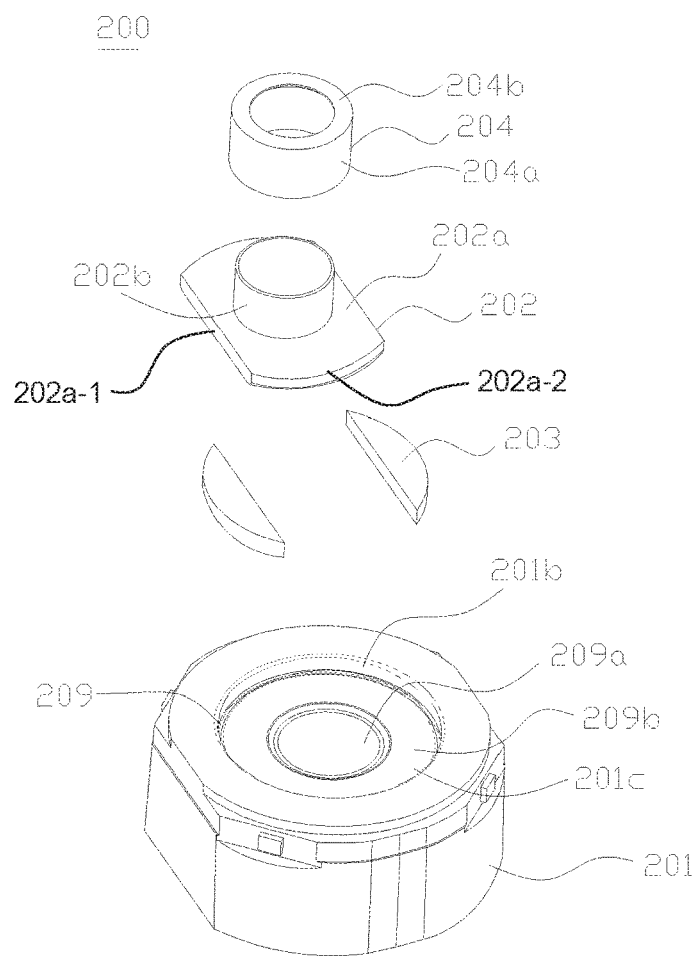
FIG. 3D is an exploded diagram of the lens device of the first embodiment of the invention.
Figure 4A:
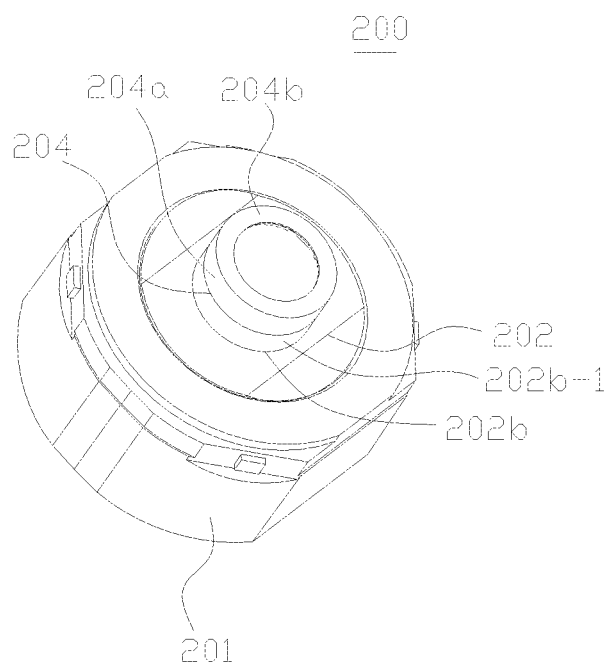
FIG. 4A depicts the structure of a lens device in accordance with a second embodiment of the invention.
Figure 4B:
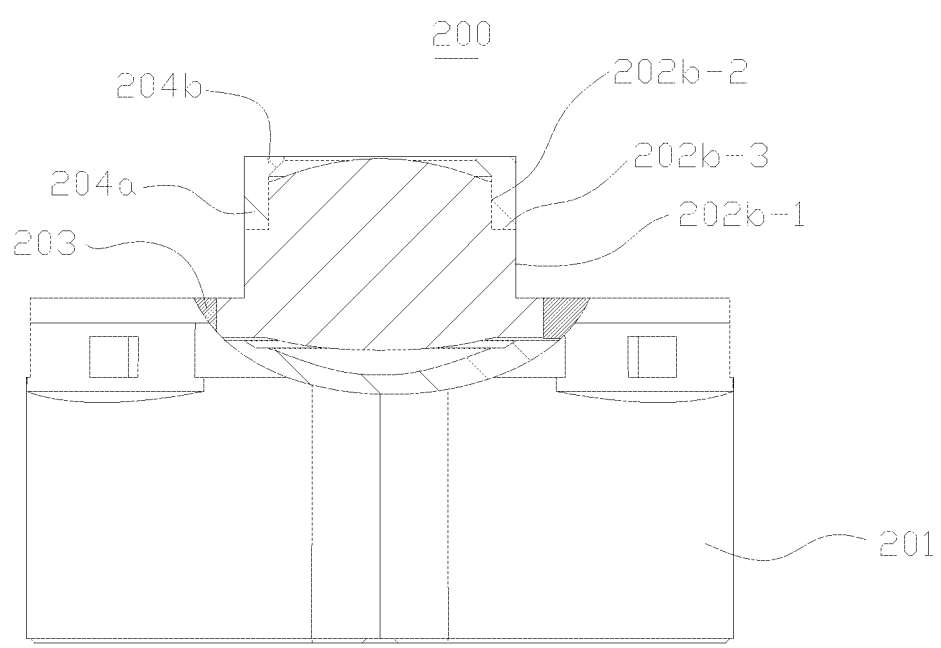
FIG. 4B is a partially sectional view of the lens device of the second embodiment of the invention.
Figure 4C:
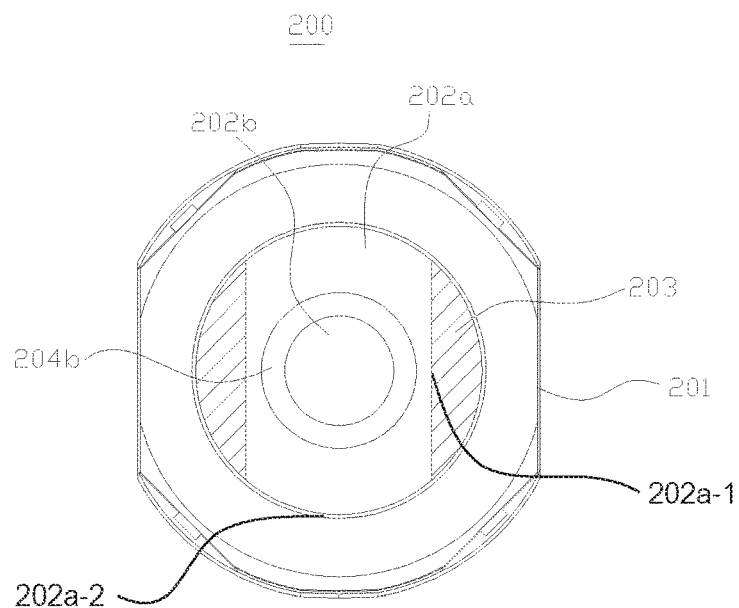
FIG. 4C is a top view of the lens device of the second embodiment of the invention.
Figure 4D:
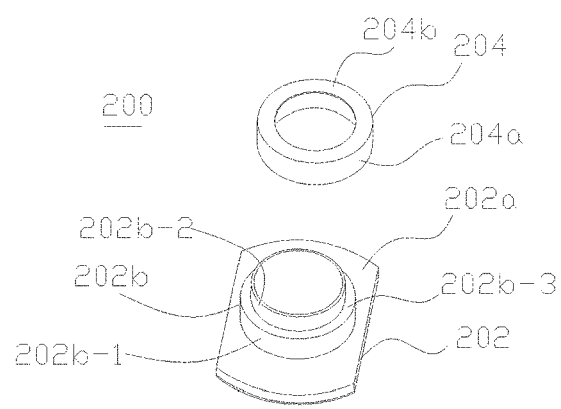
FIG. 4D is an exploded diagram of the lens device of the second embodiment of the invention.
Figure 4D:
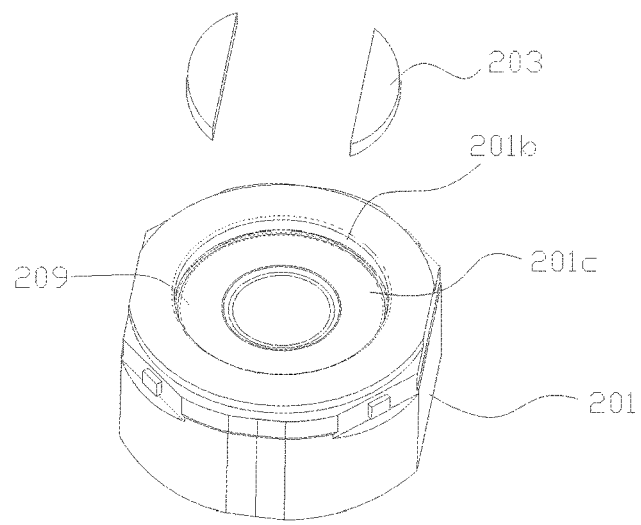
Figure 5A:
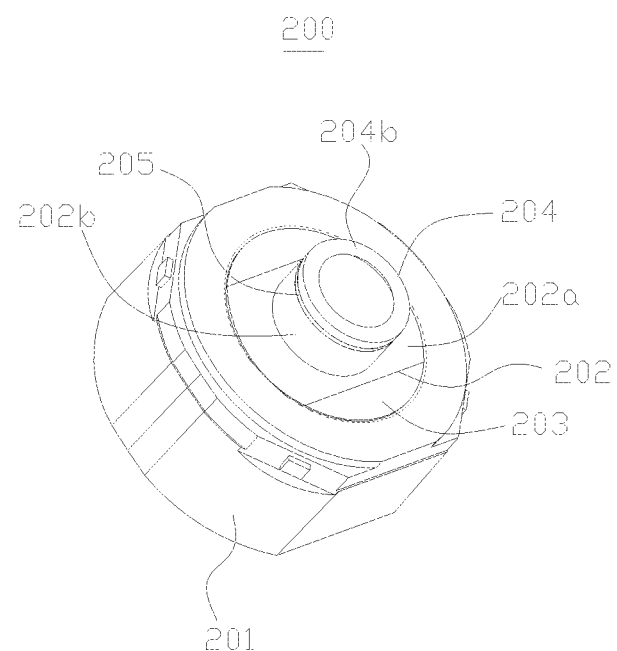
FIG. 5A depicts the structure of a lens device in accordance with a third embodiment of the invention.
Figure 5B:
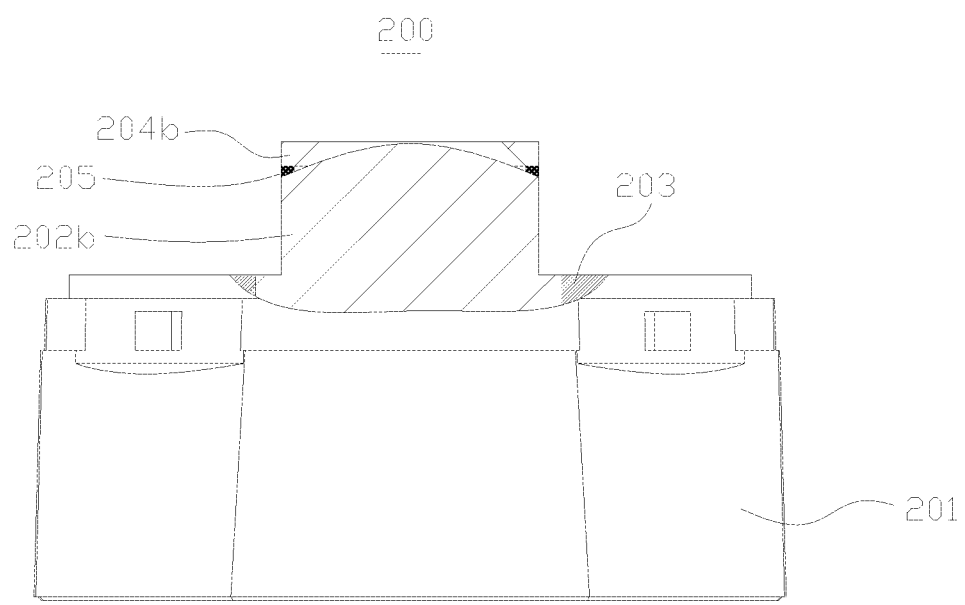
FIG. 5B is a partially sectional view of the lens device in accordance with the third embodiment of the invention.
Figure 5C:
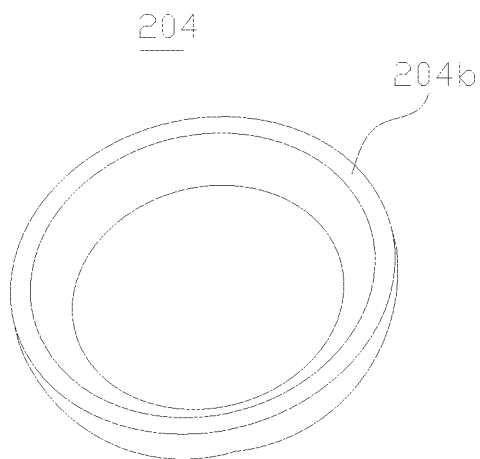
FIG. 5C depicts the structure of a cap of the lens device in accordance with the third embodiment of the invention.
Figure 5D:
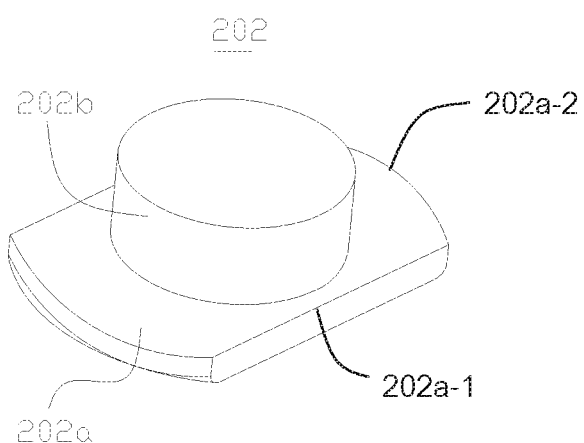
FIG. 5D depicts the structure of a first lens of the lens device in accordance with the third embodiment of the invention.
Figure 5E:
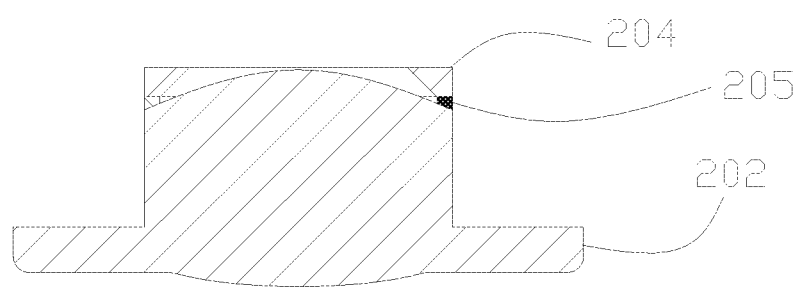
FIG. 5E is a sectional view of the first lens and cap of the lens device in accordance with the third embodiment of the invention.
Figure 6A:
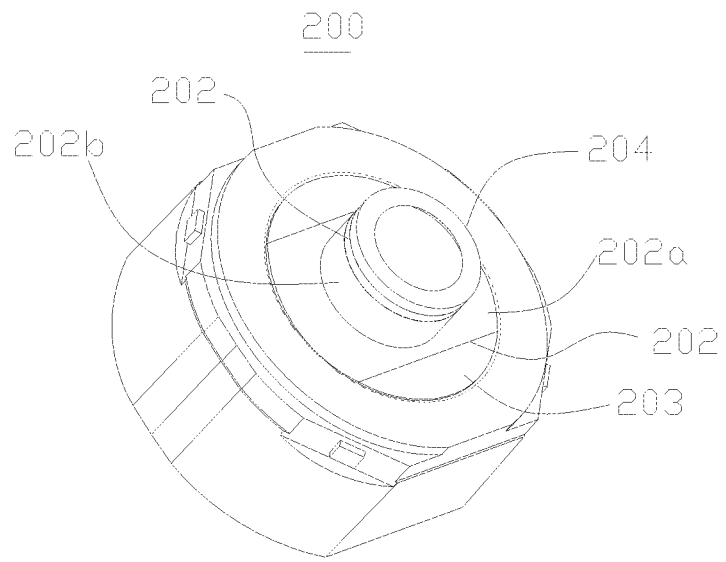
FIG. 6A depicts the structure of a lens device in accordance with a fourth embodiment of the invention.
Figure 6B:
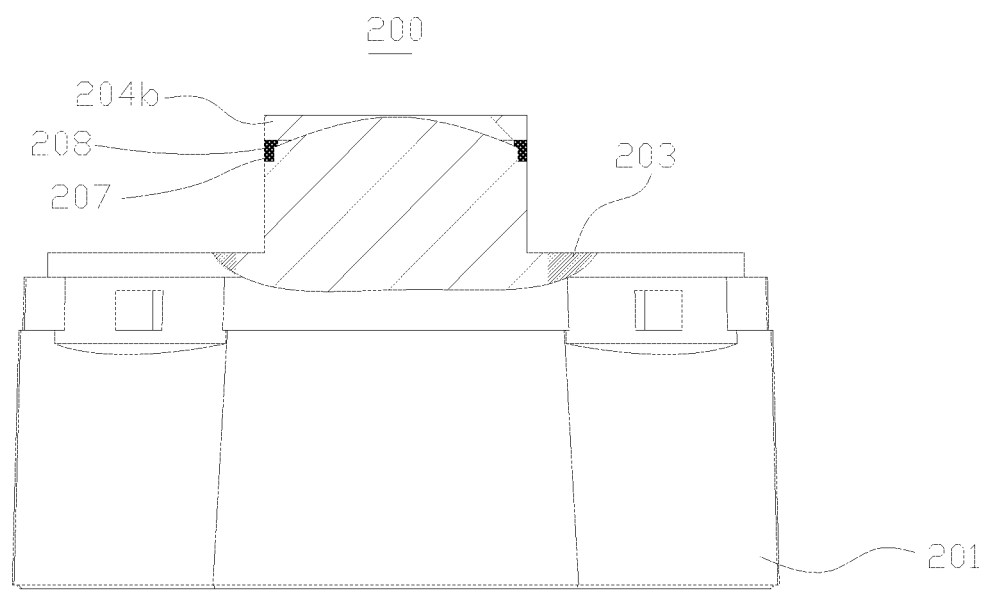
FIG. 6B is a partially sectional view of the lens device in accordance with the fourth embodiment of the invention.
Figure 6C:
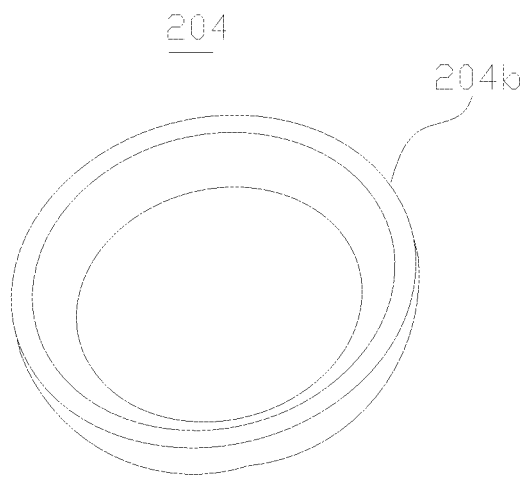
FIG. 6C depicts the structure of a cap of the lens device in accordance with the fourth embodiment of the invention.
Figure 6D:
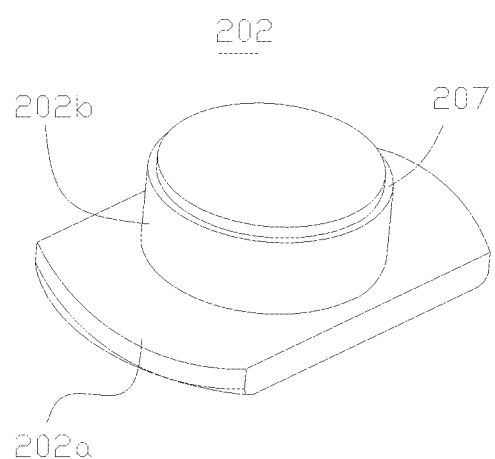
FIG. 6D depicts the structure of a first lens of the lens device in accordance with the fourth embodiment of the invention.
Figure 6E:
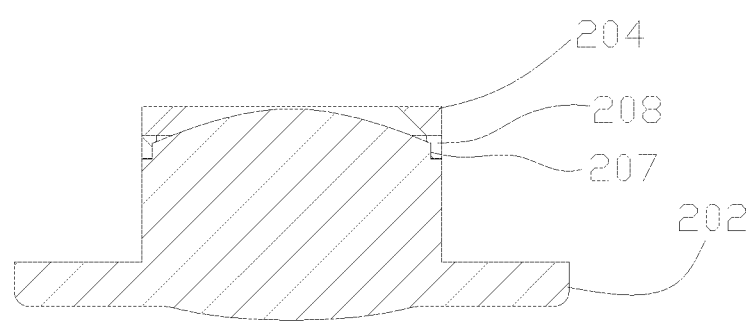
FIG. 6E is a sectional view of the first lens and cap of the lens device in accordance with the fifth embodiment of the invention.

FIGS. 3A-3D depict a lens device 200 of a first embodiment of the invention, wherein the lens device 200 includes a lens barrel 201 and a first lens 202 fixed to the lens barrel 201. The first lens 202 has an optical axis. The lens device 200 has an object side and an image side. The first lens 202 is a lens closest to the object side. The lens device 200 has a minor diameter end near the object side, and a major diameter end near the image side.

The lens barrel 201 is barrel-shaped and has steps formed therein to match external diameters of the lenses of the lens device 200. The lens barrel 201 further has an object-side end at which a receiving opening 201b is formed.

The lens device 200 further includes a second lens 209 disposed therein. The second lens 209 includes an effective-diameter portion 209a and a non-effective-diameter portion 209b surrounding the effective-diameter portion 209a. The effective-diameter portion 209a is smaller than the receiving opening 201b in diameter, while the non-effective-diameter portion 209b is greater than the receiving opening 201b in diameter. Therefore, a step surface 201c is formed by the effective-diameter portion 209a and the non-effective-diameter portion 209b.

The first lens 202 has a ⊓-shaped section (sectioned in the optical axial direction). That is, the first lens 202 in a cross section is higher at the middle portion than at both side portions, the first lens 202 is protruded at the middle portion towards the object side to form a pillar with respect to the both side portions thereof, a maximal outer diameter of the middle portion is significantly smaller than a maximal outer diameter of the both side portions, and a step is formed between the middle portion and the both side portions. Further, the first lens 202 has a major diameter portion 202a fixed to the lens barrel 201 and disposed near the image side, and a minor diameter portion 202b connected to the major diameter portion 202a and disposed near the object side. The major diameter portion 202a is fixed in the receiving opening 201b, wherein a part of the outer periphery of the major diameter portion 202a of the first lens 202 contacts the receiving opening 201b of the lens barrel 201, and another part of the outer periphery of the major diameter portion 202a of the first lens 202 is spaced from the receiving opening 201b of the lens barrel 201 to form an adhesive receiving space 201d. A projected area of the major diameter portion 202a of the first lens 202 onto a plane perpendicular to the optical axis approximately ranges from 40% to 90% of the cross-sectional area of the receiving opening 201b of the lens barrel 201. In other words, when the major diameter portion 202a of the first lens 202 is observed in the optical axial direction, the area of the major diameter portion 202a approximately ranges from 40% to 90% of the area of the receiving opening 201b. It is worth noting that the effective-diameter portion 209a of the second lens 209 is covered with the major diameter portion 202a of the first lens 202, thereby preventing the effective-diameter portion 209a of the second lens 209 from adhesive.

The major diameter portion 202a may be formed by cutting the first lens 202 along a plane parallel to the optical axis, wherein the first lens 202 to be cut matches the receiving opening 201b of the lens barrel 201 in shape. For example, the receiving opening 201b of the lens barrel 201 is circular. Therefore, the major diameter portion 202a of the first lens 202 is also circular to match the receiving opening 201b in shape before the first lens 202 is cut. The major diameter portion 202a of the first lens 202 is cut along a plane parallel to the optical axis, so that the major diameter portion 202a has flat surfaces at the outer periphery thereof. The flat surfaces are parallel to the plane formed in the optical axial direction. Accordingly, a plurality of adhesive receiving spaces 201d are formed between the outer periphery of the major diameter portion 202a of the first lens 202 and inner surfaces of the receiving opening 201b of the lens barrel 201. When the first lens 202 is observed in the optical axial direction, the outer periphery of the minor diameter portion 202b of the first lens 202 is circular, and the outer periphery of the major diameter portion 202a of the first lens 202 has two parallel straight sides and two curved sides (i.e. the outer periphery of the major diameter portion 202a of the first lens 202 has at least one straight side which is perpendicular to the optical axis, when the first lens 202 is sectioned by a plane parallel to the optical axis and observed in the optical axial direction). Therefore, the outer periphery of the major diameter portion 202a of the first lens 202 includes non-circular edge portions 202a-1 and circular edge portions 202a-2. The circular edge portions 202a-2 can be regarded as a part of a complete circle. The non-circular edge portions 202a-1 and circular edge portions 202a-2 are arranged around a center where the optical axis passes through, and are connected to each other to form the outer periphery of the major diameter portion 202a of the first lens 202. In this embodiment, the two parallel straight sides are the non-circular edge portions 202a-1 and the two curved sides are the circular edge portions 202a-2. The flat surfaces are formed on the non-circular edge portions 202a-1 and are parallel to the plane in the optical axial direction. By the described structure and design, the assembly process and adhesive-dispensing operation become more convenient, and the amount of adhesive dispensed can be controlled well.

The invention is not limited to the above embodiment and corresponding figures. For example, the major diameter portion 202a can be formed by cutting the first lens 202 along a plane unparallel to the optical axis, wherein the first lens 202 to be cut matches the receiving opening 201b of the lens barrel 201 in shape. For another example, the major diameter portion 202a can be formed by cutting the first lens 202 along a curved surface parallel or unparallel to the optical axis, wherein the first lens 202 to be cut matches the receiving opening 201b of the lens barrel 201 in shape. That is, the outer periphery of the major diameter portion 202a may include flat surfaces or curved surfaces. The flat surfaces may be parallel or unparallel to the optical axis. Similarly, the curved surfaces may be parallel or unparallel to the optical axis.

Adhesive 203 is provided for the adhesive receiving spaces 201d to fix the first lens 202 to the lens barrel 201. A projected area of the adhesive 203 onto a plane perpendicular to the optical axis approximately ranges from 10% to 60% of a cross-sectional area of the receiving opening 201b of the lens barrel 201. In other words, when the adhesive 203 is observed in the optical axial direction, the area of the adhesive 203 approximately ranges from 10% to 60% of the area of the receiving opening 201b.

In the first embodiment, the minor diameter portion 202b of the first lens 202 is substantially cylindrical and has a uniform outer diameter from the image side to the object side. The lens barrel 201 includes a cap 204. The cap 204 has a tubular main body 204a and an annular end portion 204b connected to an object-side end of the tubular main body 204a. The tubular main body 204a is disposed around the minor diameter portion 202b of the first lens 202 to form the minor diameter end of the lens device 200. That is, the minor diameter portion 202b of the first lens 202 and the cap 204 are disposed at the minor diameter end of the lens device 200. An image-side end of the tubular main body 204a is fixed to the major diameter portion 202a of the first lens 202 by adhesive. A diameter of an opening of the object-side end of the annular end portion 204b is less than an outer diameter of the minor diameter portion 202b of the first lens 202 so as to form a stop structure at the object-side end of the first lens 202. The lens barrel 201 is configured to form a major diameter end of the lens device 200, where the major diameter portion 202a of the first lens 202 is located.

It is worth noting that an inner circumferential surface of the annular end portion 204b of the cap 204 may be parallel to the optical axis or may be tapered toward the object-side end (e.g. in shape of conical frustum).

During assembly, the first lens 202 is introduced into the lens barrel 201 from the object-side end and adhesive is provided for the adhesive receiving space 201d formed between the first lens 202 and the lens barrel 201 and cured, thereby fixing the first lens 202 to the interior of the lens barrel 201. The adhesive dispensing operation is directly performed from the outside of the lens barrel 201. Therefore, the assembly and adhesive dispensing operation become very convenient. Additionally, the amount of adhesive dispensed can be controlled well.

FIGS. 4A-4D depict the structure of a lens device 200 in accordance with a second embodiment of the invention, wherein the minor diameter portion 202b of the first lens 202 and the shape of the cap 204 are modified to differ from those of the first embodiment. Other elements are the same as those of the first embodiment and the descriptions thereof are thus omitted.

In the second embodiment, the minor diameter portion 202b of the first lens 202 includes an image-side portion 202b-1 and an object-side portion 202b-2 wherein the outer diameter of the image-side portion 202b-1 is greater than that of the object-side portion 202b-2 to form a step surface 202b-3 therebetween. A length of the cap 204 in the optical axial direction is less than that of the first embodiment. The cap 204 includes a tubular main body 204a and an annular end portion 204b connected to the object-side end of the tubular main body 204a The tubular main body 204a is disposed around the object-side portion 202b-2 of the minor diameter portion 202b of the first lens 202 to form the minor diameter end of the lens device 200. That is, the minor diameter portion 202b of the first lens 202 and the cap 204 are disposed at the minor diameter end of the lens device 200. The image-side end of the tubular main body 204a contacts the step surface 202b-3 formed between the image-side portion 202b-1 and the object-side portion 202b-2 and is fixed to the step surface 202b-3 by adhesive. An inner diameter of the annular end portion 204b is less than an outer diameter of the object-side portion 202b-2 of the first lens 202 so as to form a stop structure at the object-side end of the first lens 202. The lens barrel 201 is configured to form a major diameter end of the lens device 200, where the major diameter portion 202a of the first lens 202 is located.

FIGS. 5A-5E depict the structure of a lens device 200 in accordance with a third embodiment of the invention, wherein the shape of the cap 204 are modified to differ from that of the first embodiment. Other elements are the same as those of the first embodiment and the descriptions thereof are thus omitted.

In the third embodiment, the minor diameter portion 202b of the first lens 202 is substantially cylindrical and has a uniform outer diameter from the image side to the object side. The cap 204 has an annular end portion 204b. The image-side end of the annular end portion 204b is connected to an object-side end of the minor diameter portion 202b of the first lens 202 by adhesive to form the minor diameter end of the lens device 200. That is, the minor diameter portion 202b of the first lens 202 and the cap 204 are disposed at the minor diameter end of the lens device 200. To better fix the first lens 202 which protrudes toward the object side, the image-side end of the annular end portion 204b does not directly contact the object-side end of the minor diameter portion 202b thereby forming an adhesive-dispensing space 205. Adhesive is provided for the adhesive-dispensing space 205 so as to fix the cap 204 to the first lens 202. The lens barrel 201 is configured to form a major diameter end of the lens device 200, where the major diameter portion 202a of the first lens 202 is located.

A diameter of an opening of the object-side end of the annular end portion 204b is less than an outer diameter of the minor diameter portion 202b of the first lens 202 so as to form a stop structure at the object-side end of the first lens 202. An inner circumferential surface of the annular end portion 204b of the cap 204 may be parallel to the optical axis or may be tapered toward the object-side end (e.g. in shape of conical frustum).

In assembly, the first lens 202 is fixed, the first lens 202 and the cap 204 are held in position by a clamping fixture, and adhesive is provided between the first lens 202 and the cap 204 and is cured. Thus, the first lens 202 and the cap 204 are fixed together.

FIGS. 6A-6E depict the structure of a lens device 200 in accordance with a fourth embodiment of the invention, wherein the minor diameter portion 202b of the first lens 202 and the shape of the cap 204 are modified to differ from those of the first embodiment. Other elements are the same as those of the first embodiment and the descriptions thereof are thus omitted.

In the fourth embodiment, a concave edge 207 is formed at the object-side end of the outer circumferential surface of the minor diameter portion 202b of the first lens 202.

The cap 204 has an annular end portion 204b. The image-side end of the annular end portion 204b is connected to an object-side end of the minor diameter portion 202b of the first lens 202 by adhesive to form the minor diameter end of the lens device 200. That is, the minor diameter portion 202b of the first lens 202 and the cap 204 are disposed at the minor diameter end of the lens device 200. The image-side end of the annular end portion 204b does not directly contact the object-side end of the minor diameter portion 202b. An adhesive dispensing space 208 is formed by the image-side end of the annular end portion 204b, the object-side end of the minor diameter portion 202b, and the concave edge 207. The cross section of the adhesive dispensing space 208 is reverse L-shaped. Adhesive is provided for the adhesive-dispensing space 208 so as to fix the cap 204 to the first lens 202. The lens barrel 201 is configured to form a major diameter end of the lens device 200, where the major diameter portion 202a of the first lens 202 is located.

A diameter of an opening of the object-side end of the annular end portion 204b is less than an outer diameter of the minor diameter portion 202b of the first lens 202 so as to form a stop structure at the object-side end of the first lens 202. An inner circumferential surface of the annular end portion 204b of the cap 204 may be parallel to the optical axis or may be tapered toward the object-side end (e.g. in shape of conical frustum).

In assembly, the first lens 202 is fixed, the first lens 202 and the cap 204 are held in position by a clamping fixture, and adhesive is provided between the first lens 202 and the cap 204 and is cured. Thus, the first lens 202 and the cap 204 are fixed together.

During assembly of the lens device 200 of the invention, the first lens 202 is introduced into the lens barrel 201 from the object-side end and adhesive is provided for the adhesive receiving space 201d formed between the first lens 202 and the lens barrel 201 and cured, thereby fixing the first lens 202 to the interior of the lens barrel 201. Accordingly, the lens device of the invention is able to have reduced thickness, wider view angle, and better optical performance. The adhesive dispensing operation is directly performed from the outside of the lens barrel 201. Therefore, the assembly and adhesive dispensing operation become very convenient. Additionally, the amount of adhesive provided can be controlled well.

Figure 7A:
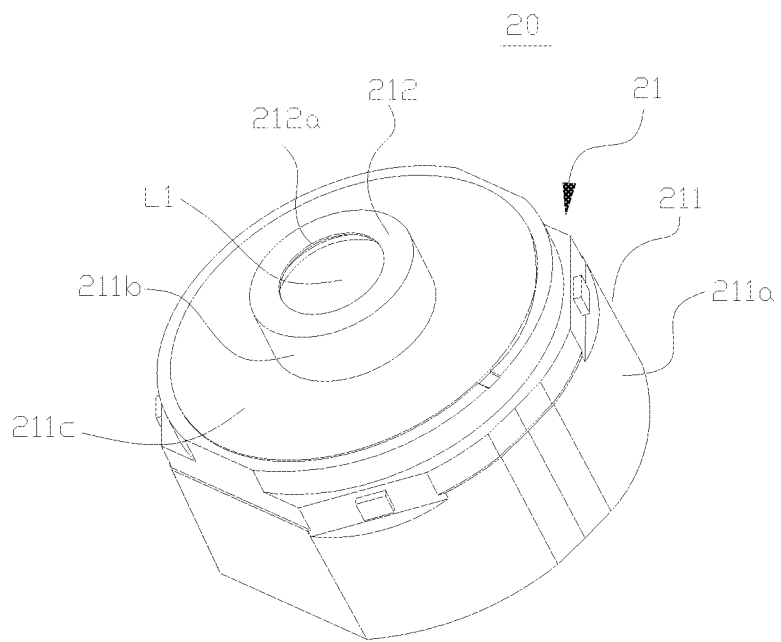
FIG. 7A depicts the structure of a lens device in accordance with a fifth embodiment of the invention.
Figure 7B:
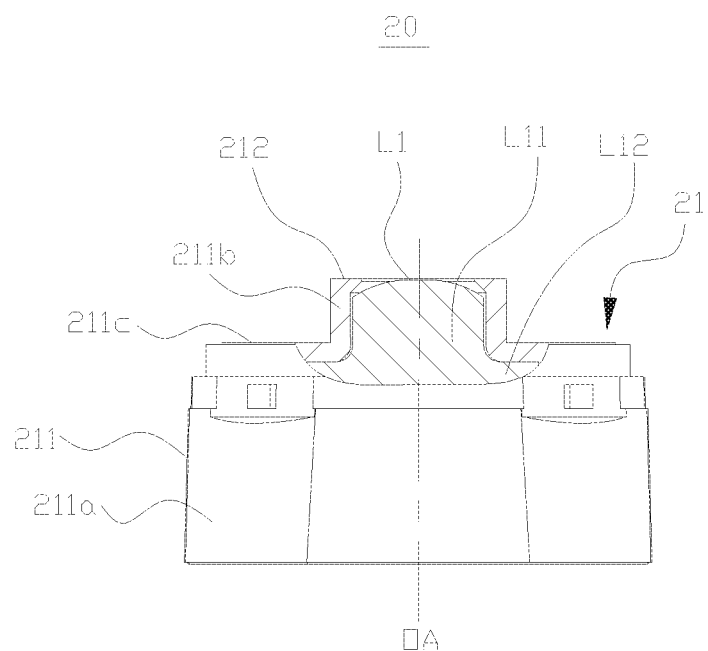
FIG. 7B is a partially sectional view of the lens device in accordance with the fifth embodiment of the invention.
Figure 7C:
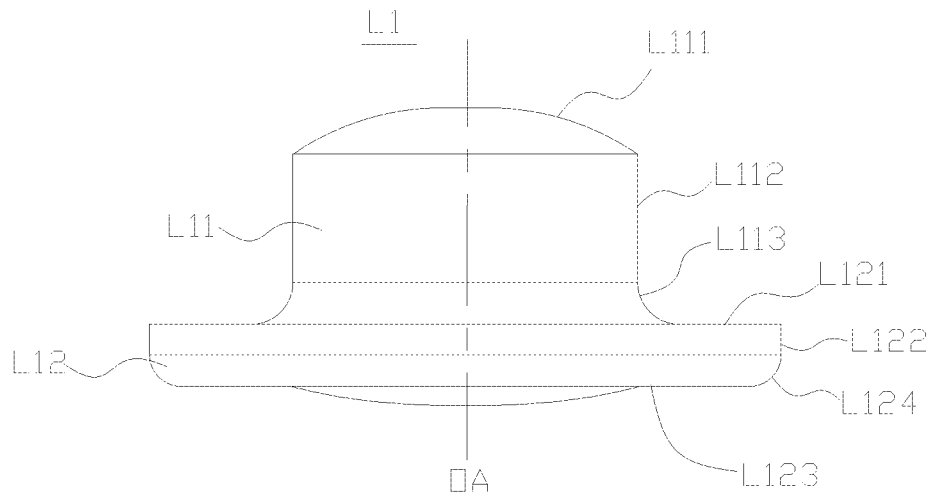
FIG. 7C is a schematic diagram of a first lens of the lens device in accordance with the fifth embodiment of the invention.

FIGS. 7A-7C depict the structure of a lens device 20 in accordance with a fifth embodiment of the invention, wherein the lens device 20 includes a lens barrel 21 and a plurality of lenses sequentially fixed in the lens barrel 21 along the optical axis OA from the object side to the image side. Among the lenses, a first lens L1 is closest to the object side. The lens device 20 has a minor diameter end near the object side, and a major diameter end near the image side.

The lens barrel 21 includes a main body 211 and an annular cap 212 connected to an object-side end of the lens barrel 21. The cap 212 is provided with an opening 212a. The lens barrel 21 may be integrally formed with the cap 212 as a continuous, unitary element. The opening 212a may be in shape of circle, non-circle, polygon with sides arranged symmetrically with respect to the optical axis, bottle, oak-barrel, polygon, or be in any shape which includes straight side(s) and/or curved side(s). An outer circumferential portion of a first object-side surface L111 of the first lens L1 corresponds to the opening 212a in shape.

The lens barrel 21 may be substantially cylindrical, or in shape of polygon, non-circle, polygon with sides arranged symmetrically with respect to the optical axis, bottle, oak-barrel, or in any shape which includes straight side(s) and/or curved side(s). The lens barrel 21 includes a major diameter part 211a near the image side, and a minor diameter part 211b near the object side. The major diameter part 211a and the minor diameter part 211b are connected to form a step surface 211c therebetween. In other words, the step surface 211c is disposed between the major diameter part 211a and the minor diameter part 211b.

The first lens L1 is disposed in the main body 211 near the object-side end of the lens barrel 21. Further, the first lens L1 may be fixed in the main body 211 by tight fitting, engaging, embedding, interference fitting or gluing. As shown, a section of the first lens L1 of this embodiment is ⊔-shaped (sectioned along the optical axis). The first lens L1 includes a minor diameter portion L11 (of a small diameter) near the object side, and a major diameter portion L12 (of a large diameter) near the image side.

The first lens L1 includes an optical effective-diameter portion and a circumferential portion for mounting. The optical effective-diameter portion has a part included by the minor diameter portion L11 of a small diameter, and another part included by the major diameter portion L12 of a large diameter. The circumferential portion is included by the major diameter portion L12 of a large diameter and is fixed in the major diameter part 211a of the lens barrel 21. The minor diameter portion L11 of the first lens L1 is located close to the minor diameter part 211b of the lens barrel 21, thereby forming the minor diameter end of the lens device 20. That is, the minor diameter portion L1 of the first lens L1 and the cap 212 are located at the minor diameter end of the lens device 20. The major diameter portion L12 of the first lens L1 is located close to the major diameter part 211a of the lens barrel 21. The major diameter part 211a of the lens barrel 21 is configured to form the major diameter end of the lens device 20. The major diameter portion L12 of the first lens L1 is located at the major diameter end of the lens device 20. The minor diameter portion L11 of the first lens L1 is located at the object side of the step surface 211c.

The minor diameter portion L1 of the first lens L1 includes, from the object side to the image side, a first object-side surface L111, a first circumferential surface L112 and a first connecting surface L113. The first object-side surface L111 is entirely included by the optical effective-diameter portion. Thus, the entirety of the first object-side surface L111 is used for image forming. In other words, every parts of the first object-side surface L111 contribute to the image forming. Therefore, a filleted part next to the first circumferential surface L112, which is not included by the first object-side surface L111, is not used for image forming. The first object-side surface L111 may be aspherical. The first circumferential surface L112 may be parallel or unparallel to the optical axis OA.

The major diameter portion L12 of the first lens L1 includes a second object-side surface L121 perpendicular to the optical axis OA, a second circumferential surface L122 and a second image-side surface L123. A second connecting surface L124 may be convex, curved, and connected between the second circumferential surface L22 and the second image-side surface L23. It is understood that a part of the second image-side surface L123 is used for image forming.

The first connecting surface L113, connected between the first circumferential surface L112 and the second object-side surface L121, may be concave and curved. From the above descriptions, it is understood that the first circumferential surface L112 is perpendicular to the second object-side surface L121.

The major diameter portion L12 of the first lens L1 is fixed in the major diameter part 211a of the lens barrel 21. The first object-side surface L111 protrudes toward the object side along the optical axis OA, and is flushed with or slightly lower than the object-side surface of the cap 212. The diameter of the opening 212a of the cap 212 is slightly less than or equals the outer diameter of the first object-side surface L111 of the first lens L1. Thus, a stop structure is formed in front of the object-side surface of the first lens L1.

Figure 8A:
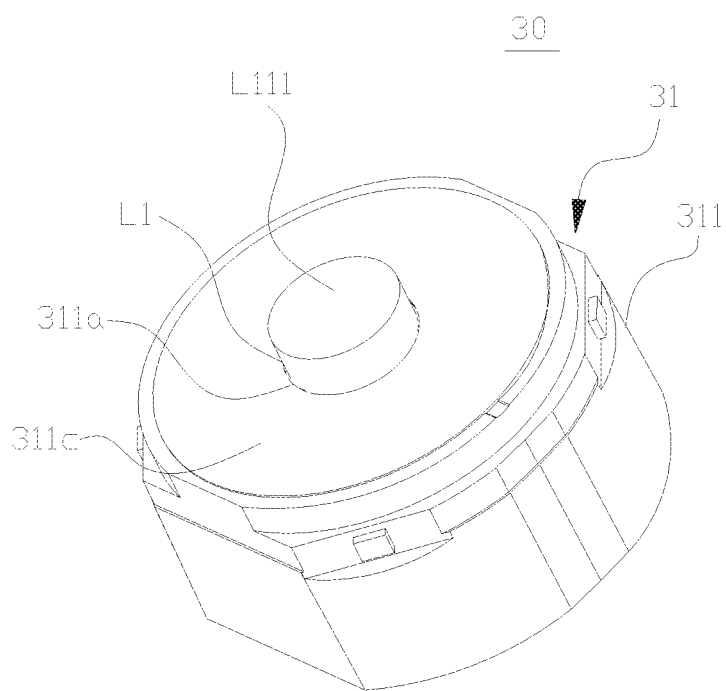
FIG. 8A depicts the structure of a lens device in accordance with a sixth embodiment of the invention.
Figure 8B:
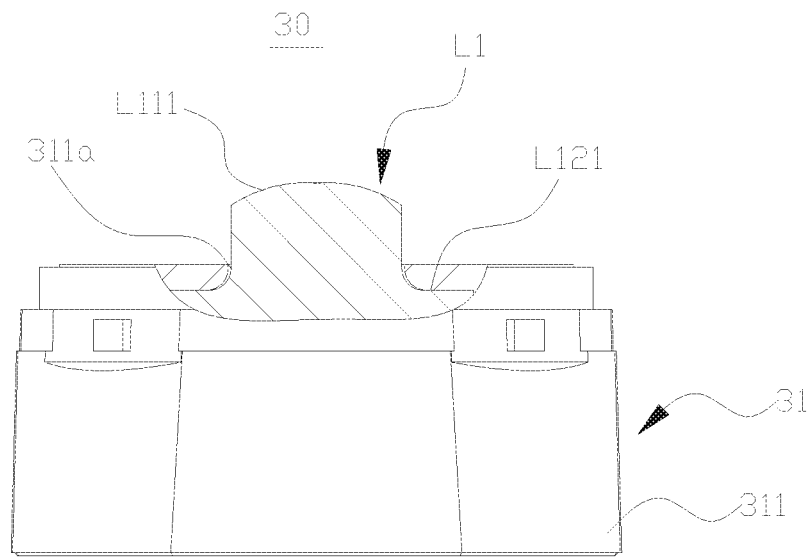
FIG. 8B is a partially sectional view of the lens device in accordance with the sixth embodiment of the invention.

FIGS. 8A and 8B depict the structure of a lens device 30 in accordance with a sixth embodiment of the invention, wherein the lens device 30 includes a lens barrel 31 and a plurality of lenses sequentially fixed in the lens barrel 31 along the optical axis OA from the object side to the image side. Among the lenses, a first lens L1 is closest to the object side. The lens device 30 has a minor diameter end near the object side, and a major diameter end near the image side. The structure of the first lens L1 of the sixth embodiment is identical to that of the fifth embodiment, while the structure of the lens barrel 31 of the sixth embodiment is different from that of the fifth embodiment.

In the sixth embodiment, the lens barrel 31 includes a main body 311 and is cylindrical. An end portion 311c of the lens barrel 31 directed at the object side is provided with a first lens-fixing opening 311a. The lens barrel 31 may be substantially cylindrical, or in shape of polygon, non-circle, polygon with sides arranged symmetrically with respect to the optical axis, bottle, or oak-barrel, or in any shape which includes straight side(s) and/or curved side(s). The first lens L1 is fixed in the main body 311 and protrudes from the first lens-fixing opening 311a, thereby forming a minor diameter end of the lens device 30. Thus, the minor diameter portion L11 of the first lens L1 is located where the minor end of the lens device 30 is. The first object-side surface L111 of the first lens L1 is convex and disposed at the object-side end portion 311c of the lens barrel 31. The second object-side surface L121 of the first lens L1 is configured to contact the inner surface of the object-side end portion 311c of the lens barrel 31. The major diameter portion L12 of the first lens L1 is disposed in the main body 311 of the lens barrel 31. The main body 311 of the lens barrel 31 is configured to form the major diameter end of the lens device 30 where the major diameter portion L12 of the first lens L1 is disposed. The minor diameter portion L11 of the first lens L1 is disposed at the object side of the step surface 211c. The first lens-fixing opening 311a may be circular, non-circular, or in shape of polygon with sides arranged symmetrically with respect to the optical axis, bottle, oak-barrel, polygon, or in any shape which includes straight side(s) and/or curved side(s). An outer circumferential portion of a first object-side surface L111 of the first lens L1 corresponds to the first lens-fixing opening 311a in shape. Between the end portion 311c on the object side of lens barrel 31 and the end portion on the image side, a plurality of straight sides, which are perpendicular to the optical axis direction, are connected to form a part of outer periphery of the major diameter part of the lens barrel 31. Those straight sides are further connected to other arc edges to form the outer periphery of the major diameter part of the lens barrel 31. The lens barrel 31 further includes a plurality of abutting portions which are oppositely arranged on the outer periphery of the major diameter part. Each of the abutting portions has a protrusion provided at the middle thereof, for achieving a more stable bearing effect when the lens barrel 31 is mounted into the lens device 30, preventing rotation of the lens barrel 31 about the optical axis, and avoiding negative influences on the imaging quality.

In the sixth embodiment, the lens barrel 31 is a continuous, unitary element made of plastic. Alternatively, the end portion 311c of the lens barrel 31 directed at the object side is made of metal and other portions of the lens barrel 31 is made of plastic, wherein the end portion 311c of the lens barrel 31 directed at the object side can be connected to other portions of the lens barrel 31 by injection molding. Because the strength of metal is superior to that of plastic, the strength of the end portion 311c of the lens barrel 31 can be enhanced when the thickness of the end portion 311c of the lens barrel 31 is greatly reduced. That is advantageous to forming of the lens barrel 31 when the end portion 311c of the lens barrel 31 has reduced thickness. The end portion 311c of the lens barrel 31 directed at the object side can be reduced to 0.1 mm in thickness. However, if the end portion 311c of the lens barrel 31 is made of plastic, then forming the lens barrel 31 of such thickness will be difficult or the strength of the lens barrel 31 of such thickness will be insufficient.

Figure 9:
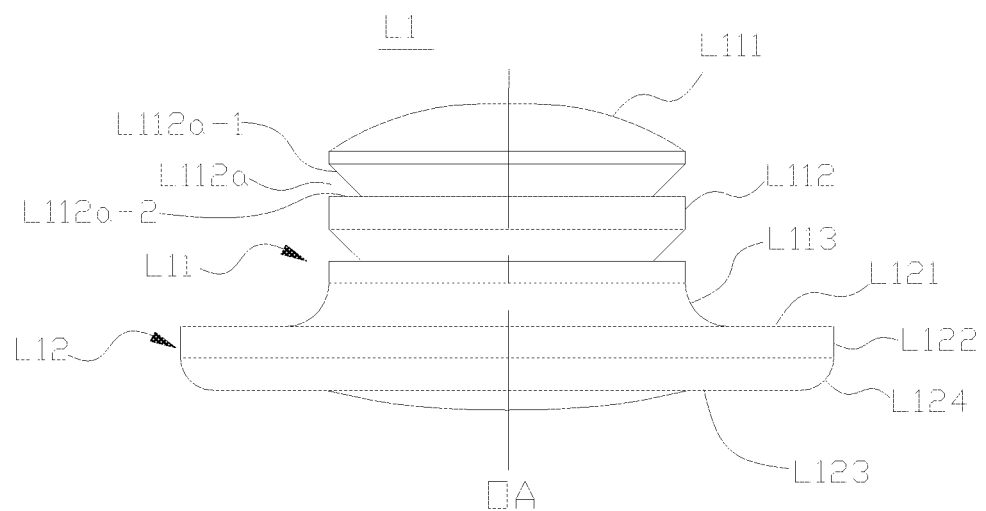
FIG. 9 depicts a first lens in accordance with another embodiment of the invention.

FIG. 9 depicts a first lens L1 in accordance with another embodiment of the invention, wherein the structure of the first lens L1 is modified to differ from that of the fifth embodiment. An annular groove L112a is provided on a first circumferential surface L12 of the first lens L1 and is symmetrical with respect to the optical axis OA of the first lens L1. It is understood that more than one groove L112a can be provided on the first circumferential surface L112 of the first lens L1 and the shape of the groove(s) L112a can be asymmetrical with respect to the optical axis OA of the first lens L. The groove L112a is used for achieving light extinction effects and reducing the ghost reflections or flare during the image-forming process. In this embodiment (FIG. 9), the entire groove L112a is formed on the optical effective-diameter portion of the first lens L1, and however the invention is not limited thereto. The first circumferential surface L112 of the first lens L1 may be unparallel to the optical axis OA and is tapered from the image side to the object side, wherein a part of the groove L112a is included by the optical effective-diameter portion of the first lens L1, and another part of the groove L112a is not included by the optical effective-diameter portion of the first lens L1.

The cross section of the groove L112a includes two inner sides: a first inner side L112a-1 near the object side and a second inner side L112a-2 near the image side. In this embodiment (FIG. 9), the first inner side L112a-1 is extended toward the object side at an acute angle with respect to the optical axis OA, and the second inner side L112a-2 is extended perpendicular to the optical axis OA. It is worth noting that the groove L12a shown in FIG. 9 can be provided in all of the embodiments of the invention. In other word, the sum of the angle of the first inner side L112a-1 to the optical axis OA and the angle of the second inner side L112a-2 to the optical axis OA ranges from 25° to 75°, and preferably ranges from 35° to 65°. While the groove L112a of the first lens L1 satisfies the condition, the lens device is capable of reducing the opportunity of the flare into the barrel or sensor, achieving light extinction effects and reducing the ghost reflections or flare during the image-forming process.

Figure 10:
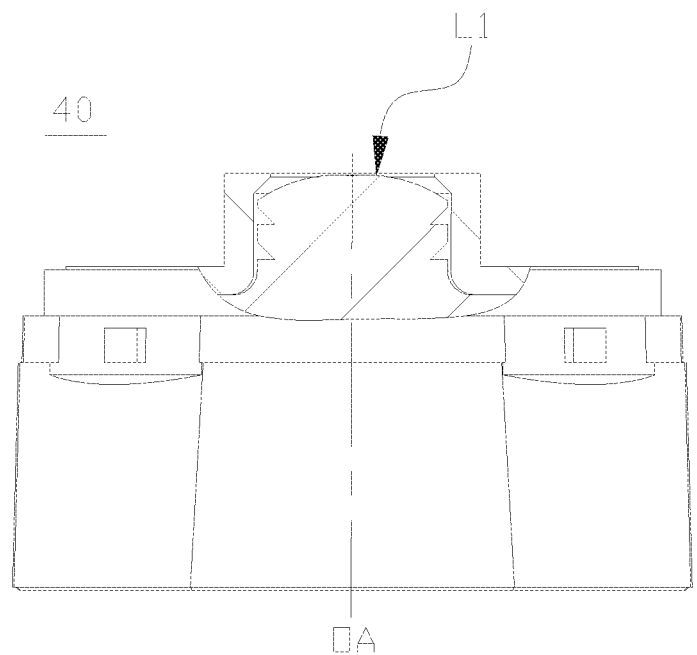
FIG. 10 is a partially sectional view of a lens device in accordance with a seventh embodiment of the invention.

FIG. 10 is a partially sectional view of a lens device 40 in accordance with a seventh embodiment of the invention. The lens device 40 of the seventh embodiment and the lens device 20 of the fifth embodiment have same elements and therefore the descriptions thereof are omitted. The seventh embodiment differs from the fifth embodiment (FIGS. 7A-7C) in the structure of the first lens L1, and the structure of the first lens L1 of the seventh embodiment is identical to that of FIG. 9.

Figure 11:
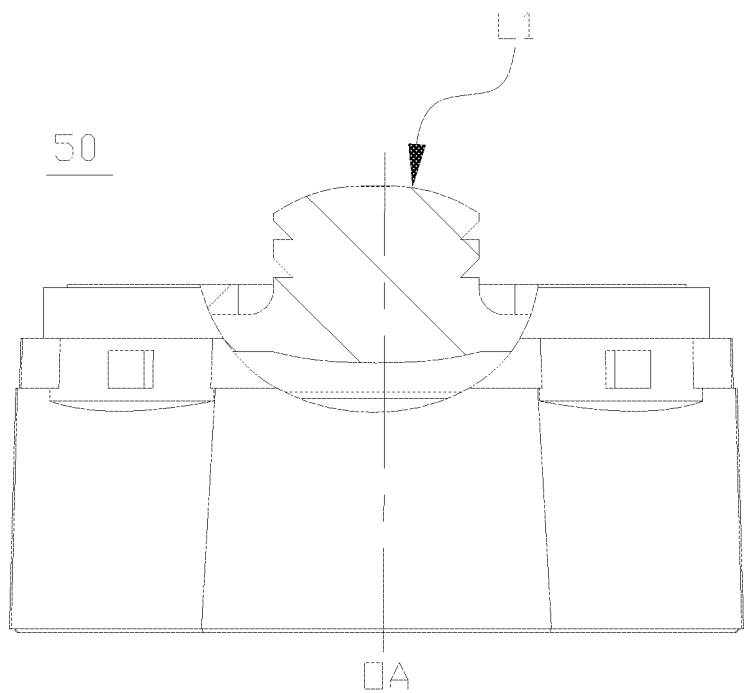
FIG. 11 is a partially sectional view of a lens device in accordance with an eighth embodiment of the invention.

FIG. 11 is a partially sectional view of a lens device 50 in accordance with an eighth embodiment of the invention. The lens device 50 of the eighth embodiment and the lens device 30 of the sixth embodiment have same elements and therefore the descriptions thereof are omitted. The eighth embodiment differs from the sixth embodiment (FIGS. 8A-8B) in the structure of the first lens L1, and the structure of the first lens L1 of the eighth embodiment is identical to that of FIG. 9.

Figure 12:
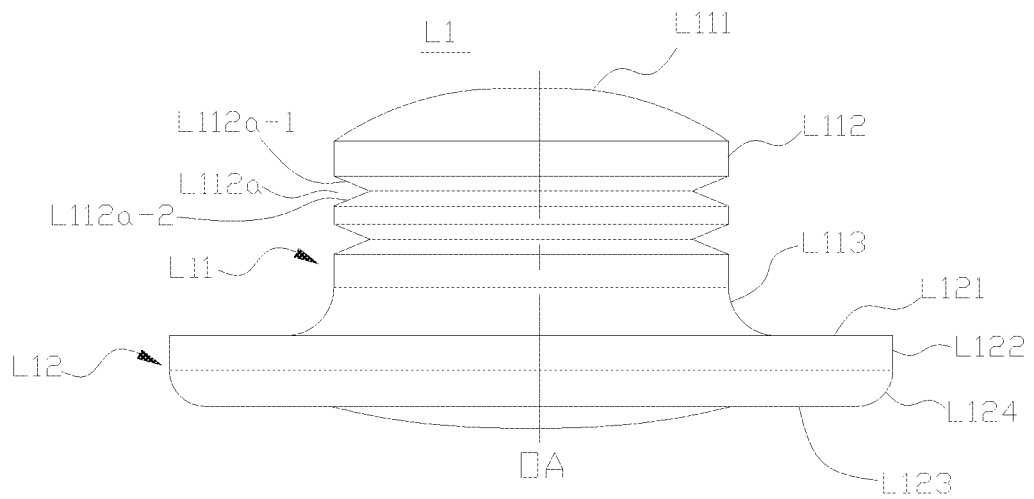
FIG. 12 is a schematic diagram of a first lens in accordance with another embodiment of the invention.

FIG. 12 is a schematic diagram of the first lens L1 in accordance with another embodiment of the invention, wherein some parts of the first lens L1 of this embodiment are the same as those of FIG. 9 and therefore the descriptions thereof are omitted. The differences therebetween are described herein. In this embodiment (FIG. 12), the cross section of the groove L112a includes two inner sides: a first inner side L112a-1 near the object side and a second inner side L12a-2 near the image side. The first inner side L112a-1 is extended toward the object side at an acute angle with respect to the optical axis OA, and the second inner side L12a-2 is extended toward the image side at another acute angle with respect to the optical axis OA, thereby better achieving light extinction effects and reducing the ghost or flare reflections, as compared with those of the embodiment shown in FIG. 9. It is worth noting that the groove L12a shown in FIG. 12 can be provided in all of the embodiments of the invention. In other word, the sum of the angle of the first inner side L112a-1 to the optical axis OA and the angle of the second inner side L112a-2 to the optical axis OA ranges from 50° to 150° and preferably ranges from 70° to 120°. While the groove L12a of the first lens L1 satisfies the condition, the lens device is capable of reducing the opportunity of the flare into the barrel or sensor, achieving light extinction effects and reducing the ghost reflections or flare during the image-forming process.

Figure 13:
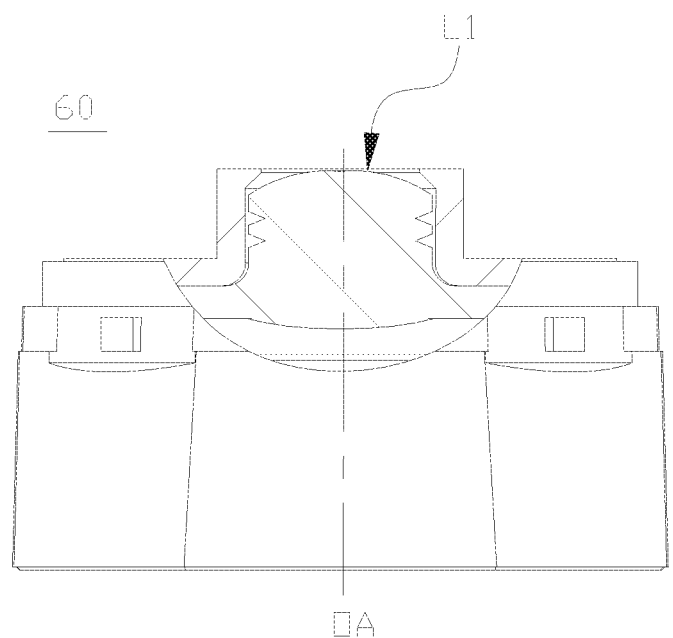
FIG. 13 is a partially sectional view of a lens device in accordance with a ninth embodiment of the invention.

FIG. 13 is a partially sectional view of a lens device 60 in accordance with a ninth embodiment of the invention. The lens device 60 of the ninth embodiment and the lens device 20 of the fifth embodiment have same elements and therefore the descriptions thereof are omitted. The ninth embodiment differs from the fifth embodiment (FIGS. 7A-7C) in the structure of the first lens L1, and the structure of the first lens L1 of the ninth embodiment is identical to that of FIG. 12.

Figure 14:
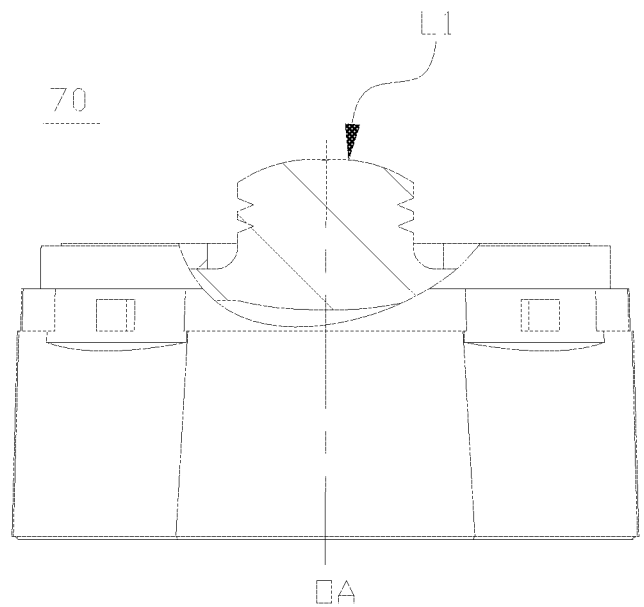
FIG. 14 is a partially sectional view of a lens device in accordance with a tenth embodiment of the invention.

FIG. 14 is a partially sectional view of a lens device 70 in accordance with a tenth embodiment of the invention. The lens device 70 of the tenth embodiment and the lens device 30 of the sixth embodiment have same elements and therefore the descriptions thereof are omitted. The tenth embodiment differs from the sixth embodiment (FIGS. 8A-8B) in the structure of the first lens L1, and the structure of the first lens L1 of the tenth embodiment is identical to that of FIG. 12.

Figure 15:
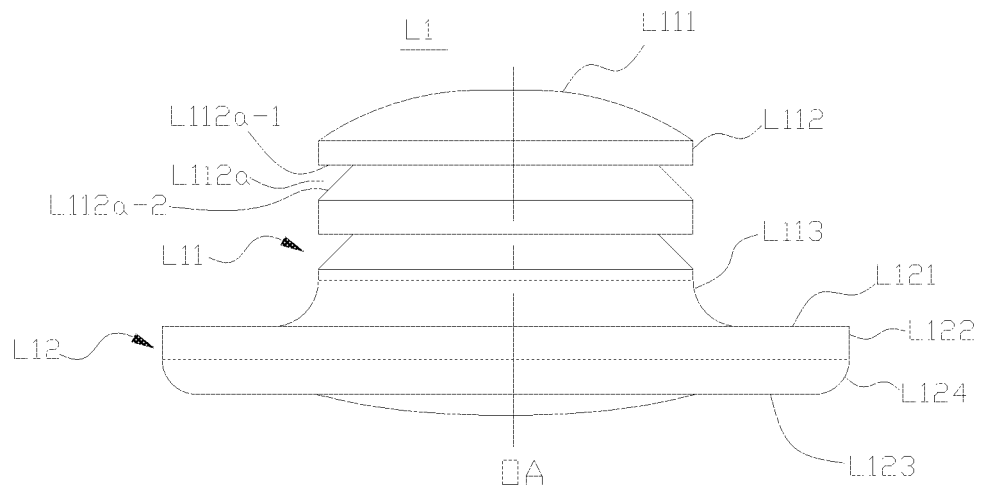
FIG. 15 is a schematic diagram of a first lens in accordance with another embodiment of the invention.

FIG. 15 is a schematic diagram of the first lens L1 in accordance with another embodiment of the invention, wherein some parts of the first lens L1 of this embodiment are the same as those of FIG. 9 and therefore the descriptions thereof are omitted. The differences therebetween are described herein. In this embodiment (FIG. 15), the cross section of the groove L112a includes two inner sides: a first inner side L112a-1 near the object side and a second inner side L112a-2 near the image side. The first inner side L112a-1 is perpendicular to the optical axis OA, and the second inner side L112a-2 is extended toward the image side at an acute angle with respect to the optical axis OA. It is worth noting that the groove L112a shown in FIG. 15 can be provided in all of the embodiments of the invention. In other word, the sum of the angle of the first inner side L112a-1 to the optical axis OA and the angle of the second inner side L112a-2 to the optical axis OA ranges from 25° to 75°, and preferably ranges from 35° to 65°. While the groove L112a of the first lens L1 satisfies the condition, the lens device is capable of reducing the opportunity of the flare into the barrel or sensor, achieving light extinction effects and reducing the ghost reflections or flare during the image-forming process.

Figure 16:
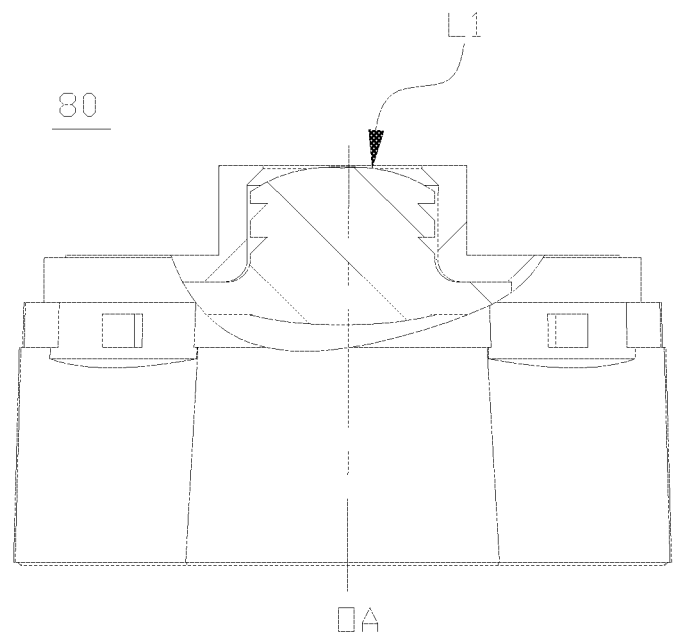
FIG. 16 is a partially sectional view of a lens device in accordance with an eleventh embodiment of the invention.

FIG. 16 is a partially sectional view of a lens device 80 in accordance with an eleventh embodiment of the invention. The lens device 80 of the eleventh embodiment and the lens device 20 of the fifth embodiment have same elements and therefore the descriptions thereof are omitted. The eleventh embodiment differs from the fifth embodiment (FIGS. 7A-7C) in the structure of the first lens L1, and the structure of the first lens L1 of the eleventh embodiment is identical to that of FIG. 15.

Figure 17:
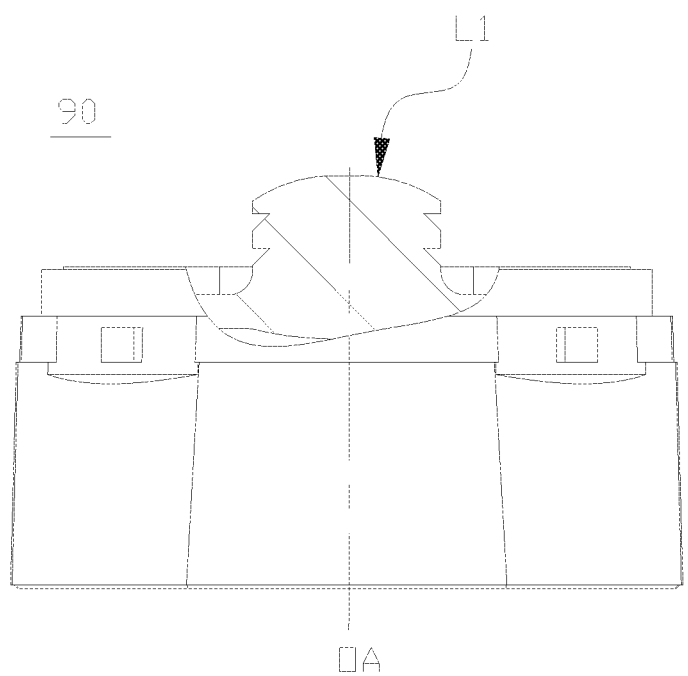
FIG. 17 is a partially sectional view of a lens device in accordance with a twelfth embodiment of the invention.

FIG. 17 is a partially sectional view of a lens device 90 in accordance with a twelfth embodiment of the invention. The lens device 90 of the twelfth embodiment and the lens device 30 of the sixth embodiment have same elements and therefore the descriptions thereof are omitted. The twelfth embodiment differs from the sixth embodiment (FIGS. 8A-8B) in the structure of the first lens L1, and the structure of the first lens L1 of the twelfth embodiment is identical to that of FIG. 15.

In all the above embodiments, each lens device can further include a reflector (not shown). The reflector may be, for example, a prism, a reflecting mirror, a beam splitter, or any element able to change a travelling path of a light beam. The reflector can be disposed at the object side of the lens device, between the lenses in the lens barrel, or between the lens barrel and a sensing element. The sensing element is an image sensor which may be, for example, a charge coupled device (CCD) or a complementary metal-oxide semiconductor (CMOS) image sensor. The lens device of the invention can be provided in an electronic device, an image-capturing device, a portable smart device, a cell phone, a tablet computer, a car, etc. Further, the lens device can include more than one reflector. For example, a first reflector is disposed at the object side of the lens device and a second reflector is disposed between the lenses in the lens barrel. By providing the reflector(s) at any described location(s) in the lens device of the invention, a device having the lens device of the invention can be reduced in size/volume and thinned, the back focal length of the optical system of the lens device can be increased, and the image-forming quality is still good.

As compared with that of the prior art, the lens device of the invention has reduced thickness, wider view angle, and better optical performance. Further, the lens device of the invention is able to achieve light extinction effects and reduce the ghost or flare reflections during the image-forming process, and the assembly of the lens device of the invention is more convenient.

What is claimed is:

1. A lens device, comprising:
a lens barrel comprising an object-side end and a cap; and
a first lens fixed to the object-side end of the lens barrel, configured to form an optical axis, and comprising a minor diameter portion near an object side of the lens device and a major diameter portion near an image side of the lens device;
wherein the major diameter portion is connected to the minor diameter portion;
wherein a section of the first lens sectioned along the optical axis is higher at a middle portion than at both side portions, and the first lens is protruded at the middle portion towards the object side to form a pillar with respect to the both side portions thereof;
wherein the cap comprises an annular end portion, the annular end portion is connected to the minor diameter portion, the lens barrel is provided with a first receiving opening, and a part of an outer periphery of the major diameter portion contacts the first receiving opening.

2. The lens device as claimed in claim 1, wherein the first lens further comprises a first circumferential surface, at least one groove is formed on the first circumferential surface, and the groove is annular and is extended around a center where the optical axis passes through.

3. The lens device as claimed in claim 2, wherein a cross section of the groove comprises a first inner side and a second inner side, one of which is extended at an acute angle with respect to the optical axis, and the other of which is extended at an acute angle with respect to the optical axis or is perpendicular to the optical axis, wherein the first inner side is closer to the object side than the second inner side while the second inner side is closer to the image side than the first inner side.

4. The lens device as claimed in claim 3, wherein a sum of the angle of the first inner side to the optical axis and the angle of the second inner side to the optical axis OA ranges from 25° to 75°.

5. The lens device as claimed in claim 3, wherein a sum of the angle of the first inner side to the optical axis and the angle of the second inner side to the optical axis OA ranges from 70° to 120°.

6. The lens device as claimed in claim 1, wherein the outer periphery of the major diameter portion comprises a non-circular edge portion and a circular edge portion connected to each other.

7. The lens device as claimed in claim 6, wherein a receiving space is formed between the non-circular edge portion of the outer periphery of the major diameter portion and the first receiving opening, a flat surface is formed on the non-circular edge portion, and the flat surface is parallel to a plane formed in the optical axial direction.

8. The lens device as claimed in claim 7, wherein an annular space is formed between an image-side end of the annular end portion and an object-side end of the minor diameter portion, and the annular end portion is configured to form a stop structure at an object-side end of the first lens.

9. The lens device as claimed in claim 7, wherein an object-side end of the minor diameter portion comprises a concave edge, and the annular end portion is configured to form a stop structure at an object-side end of the first lens.

10. The lens device as claimed in claim 7, wherein an adhesive is provided for the receiving space to fix the first lens to the lens barrel;
wherein a projected area of the adhesive onto another plane perpendicular to the optical axis ranges from 10% to 60% of a cross-sectional area of the first receiving opening of the lens barrel.

11. The lens device as claimed in claim 7, wherein a projected area of the major diameter portion of the first lens onto another plane perpendicular to the optical axis ranges from 40% to 90% of a cross-sectional area of the first receiving opening of the lens barrel.

12. The lens device as claimed in claim 1, wherein the cap further comprises a cylindrical main body connected to the annular end portion and disposed around the minor diameter portion.

13. The lens device as claimed in claim 12, wherein the minor diameter portion comprises an image-side portion and an object-side portion, an outer diameter of the image-side portion is greater than that of the object-side portion to form a step surface therebetween, and the cylindrical main body is disposed around the object-side portion.

14. The lens device as claimed in claim 1, wherein:
the lens barrel further comprises a major diameter part near the image side, and a minor diameter part near the object side;
the cap is connected to the minor diameter part;
the major diameter part is connected to the minor diameter part to form a step surface therebetween;
the cap is located where an object-side end of the lens device is;
the major diameter portion is fixed in the major diameter part;
the minor diameter portion extends from the major diameter portion toward the object side along the optical axis, and enters the minor diameter part;
the minor diameter portion is flushed with or is lower than an object-side surface of the cap.

15. The lens device as claimed in claim 14, wherein:
the cap is provided with an opening;
the opening includes a straight side or a curved side;
the minor diameter portion directed at the object-side surface corresponds to the opening in shape;
wherein the opening is in shape of circle, non-circle, polygon with sides arranged symmetrically with respect to the optical axis, bottle, oak barrel, or polygon.

16. The lens device as claimed in claim 15, wherein a diameter of the opening is less than or equals an outer diameter of the minor diameter portion directed at the object-side surface so as to form a stop structure at an object-side end of the first lens.

17. A lens device comprising:
a lens barrel comprising an object-side end; and
a first lens fixed to the object-side end of the lens barrel, configured to form an optical axis, and comprising a minor diameter portion near an object side of the lens device and a major diameter portion near an image side of the lens device;
wherein the major diameter portion is connected to the minor diameter portion;
wherein a section of the first lens sectioned along the optical axis is higher at a middle portion than at both side portions, and the first lens is protruded at the middle portion towards the object side to form a pillar with respect to the both side portions thereof;
wherein an end portion of the lens barrel directed at the object side is provided with a first lens-fixing opening;
wherein the major diameter portion is configured to contact an inner surface of the end portion of the lens barrel;
wherein the minor diameter portion extends from the major diameter portion toward the object side along the optical axis and protrudes from the first lens-fixing opening;
wherein the lens barrel, except the end portion, is made of plastic;
wherein the end portion of the lens barrel is made of metal.

18. The lens device as claimed in claim 17, wherein the first lens further comprises a first circumferential surface, at least one groove is formed on the first circumferential surface, and the groove is annular and is extended around a center where the optical axis passes through; a cross section of the groove comprises a first inner side and a second inner side, one of which is extended at an acute angle with respect to the optical axis, and the other of which is extended at an acute angle with respect to the optical axis or is perpendicular to the optical axis, wherein the first inner side is closer to the object side than the second inner side while the second inner side is closer to the image side than the first inner side.

19. A lens device comprising:
a lens barrel comprising an object-side end; and
a first lens fixed to the object-side end of the lens barrel, configured to form an optical axis, and comprising a minor diameter portion near an object side of the lens device and a major diameter portion near an image side of the lens device;
wherein the major diameter portion is connected to the minor diameter portion;
wherein a section of the first lens sectioned along the optical axis is higher at a middle portion than at both side portions, and the first lens is protruded at the middle portion towards the object side to form a pillar with respect to the both side portions thereof;
wherein an end portion of the lens barrel is directed at the object side, and the lens barrel further comprises a major diameter part near the image side and a minor diameter part near the object side;
wherein between the end portion on the object side and another end portion on the image side of the lens barrel, a plurality of straight sides are formed perpendicular to the optical axis direction;
wherein the straight sides are connected to form a part of outer periphery of the major diameter part of the lens barrel;
wherein the lens barrel further comprises a plurality of abutting portions which are oppositely arranged on the outer periphery of the major diameter part, and a protrusion is provided at a middle of the abutting portion.

* * * * *